(12) United States Patent
Hightower et al.

(10) Patent No.: US 9,436,444 B2
(45) Date of Patent: Sep. 6, 2016

(54) METHOD AND SYSTEM TO DETERMINE COMPONENT DEPRECATION

(75) Inventors: Jason Hightower, Port Coquitlam (CA); Chad M. MacKenzie, Ottawa (CA)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1099 days.

(21) Appl. No.: 12/616,246

(22) Filed: Nov. 11, 2009

(65) Prior Publication Data

US 2014/0033165 A1    Jan. 30, 2014

(51) Int. Cl.
*G06F 17/30*    (2006.01)
*G06F 9/44*    (2006.01)

(52) U.S. Cl.
CPC . *G06F 8/36* (2013.01); *G06F 8/71* (2013.01); *G06F 9/4428* (2013.01); *G06F 8/20* (2013.01)

(58) Field of Classification Search
CPC ........... G06F 8/36; G06F 8/71; G06F 9/4428
See application file for complete search history.

(56) References Cited

U.S. PATENT DOCUMENTS

| | | | | |
|---|---|---|---|---|
| 7,278,106 | B1 * | 10/2007 | Mason | 715/744 |
| 2003/0120688 | A1 * | 6/2003 | Hill et al. | 707/203 |
| 2003/0192029 | A1 * | 10/2003 | Hughes | 717/101 |
| 2003/0220891 | A1 * | 11/2003 | Fish | 707/1 |
| 2005/0278356 | A1 * | 12/2005 | Welz | 707/100 |
| 2006/0080656 | A1 * | 4/2006 | Cain et al. | 717/174 |
| 2006/0229929 | A1 * | 10/2006 | Hughes | 705/9 |
| 2006/0236083 | A1 * | 10/2006 | Fritsch et al. | 713/1 |
| 2006/0242188 | A1 * | 10/2006 | Tsyganskiy et al. | 707/102 |
| 2006/0265688 | A1 * | 11/2006 | Carlson et al. | 717/101 |
| 2006/0294158 | A1 * | 12/2006 | Tsyganskiy et al. | 707/202 |
| 2007/0033567 | A1 * | 2/2007 | Carlson et al. | 717/100 |
| 2008/0027780 | A1 * | 1/2008 | Greenstein | 705/8 |
| 2008/0196000 | A1 * | 8/2008 | Fernandez-Ivern et al. | 717/101 |
| 2008/0320460 | A1 * | 12/2008 | Miller et al. | 717/162 |
| 2009/0083429 | A1 * | 3/2009 | Krig | 709/228 |
| 2009/0293043 | A1 * | 11/2009 | Begel et al. | 717/122 |

\* cited by examiner

*Primary Examiner* — Aleksandr Kerzhner
*Assistant Examiner* — Eddy Cheung
(74) *Attorney, Agent, or Firm* — Shook Hardy & Bacon L.L.P. Intellectual Property Department

(57) ABSTRACT

A method and system of marking the deprecation status of components, such as services, processes, operations, and data types that may be used in a computing application, and displaying this status to developers within the computing application is provided. Components may be marked as deprecated, or they may include information reflecting a sunset policy, which consists of either a specific date or an upcoming version number of the application or programming language the computing application supports. The sunset policy determines when a component has reached its end of life and is either no longer supported or will be removed from the underlying product. Using this deprecation status information, the computing application may be configured to dynamically notify developers of when components will be deprecated. The computing application may further be configured to provide automated migration support by recommending alternative components and assisting in their configurations.

20 Claims, 8 Drawing Sheets

700

```xml
<component xmlns="http://adobe.com/idp/dsc/component/document">

<component-id>com.adobe.idp.dsc.sample.deprecationservice.DeprecationComponent</component-id>

<version>1.0</version>

<services>

<service name="DeprecatedService" deprecated="true" replaced-by="replacement service" sunsetting-on="10.1" deprecated-since="9.1">

<implementation-class>com.adobe.idp.dsc.sample.deprecationservice.DeprecationServiceImpl</implementation-class>

<auto-deploy category-id="samples" />

<operations>

<operation name="deprecatedOperation" deprecated="true" replaced-by="replacement operation" sunsetting-on="10" deprecated-since="9" />

</operations> </service>

<service name="ExplicitUndeprecatedService" deprecated="false">

<implementation-class>com.adobe.idp.dsc.sample.deprecationservice.DeprecationServiceImpl</implementation-class>

<auto-deploy category-id="samples" />

<operations>

<operation name="undeprecatedOperation" deprecated="false" />

</operations> </service>

<service name="DefaultUndeprecatedService">

<implementation-class>com.adobe.idp.dsc.sample.deprecationservice.DeprecationServiceImpl</implementation-class>

<auto-deploy category-id="samples" />

<operations>

<operation name="undeprecatedOperation">

</operation> </operations> </service> </services>

<data-types>

<data-type id="com.adobe.idp.dsc.sample.deprecationservice.datatype.DeprecatedDataType" deprecated="true" deprecated-since="9.1" sunsetting-on="10.1" replaced-by="some data type" />

<data-type id="com.adobe.idp.dsc.sample.deprecationservice.datatype.UndeprecatedDataType" deprecated="false" />

<data-type id="com.adobe.idp.dsc.sample.deprecationservice.datatype.DefaultUndeprecatedDataType"/>

</data-types> </component>
```

*FIG. 7*

METHOD AND SYSTEM TO DETERMINE COMPONENT DEPRECATION

TECHNICAL FIELD

This disclosure relates generally to the technical field of interactive software development environments and, in one example embodiment, to a method and system to determine component deprecation in a computer application.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today's enterprise-level programming environments offer access to thousands of libraries, classes, and services that are regularly updated, replaced, and deprecated. In computer software standards and documentation, the term deprecated is applied to software features that are superseded and should be avoided. Currently, these environments contain limited means to notify developers that they are using deprecated services, which makes the transition to a new version of an application programming interface (API) error prone and difficult. It is also unclear to users how long a deprecated service will remain supported and whether it can safely be used.

In the Java™ programming language, identifying deprecated classes requires a developer to read the Javadoc™ documentation. The maintainer of the class library must also manually update the documentation in order to communicate to the developers whenever a class is deprecated. The developer of a computing application must then perform any required changes manually if functionality being used in the application may no longer be available or compatible. This manual method also does not identify any information about when a class may be deprecated in the future or when a deprecated class will be removed altogether. Unless a developer learns from an outside source that a class is being deprecated, he or she may not learn of the deprecation until the day it happens in a version update.

BRIEF DESCRIPTION OF DRAWINGS

Embodiments are illustrated by way of example and not limitation in the figures of the accompanying drawings, in which like references indicate similar elements and in which:

FIG. 7 is an extensible markup language file showing components marked as deprecated and components marked as not deprecated, in accordance with an example embodiment.

DETAILED DESCRIPTION

Figure 1:
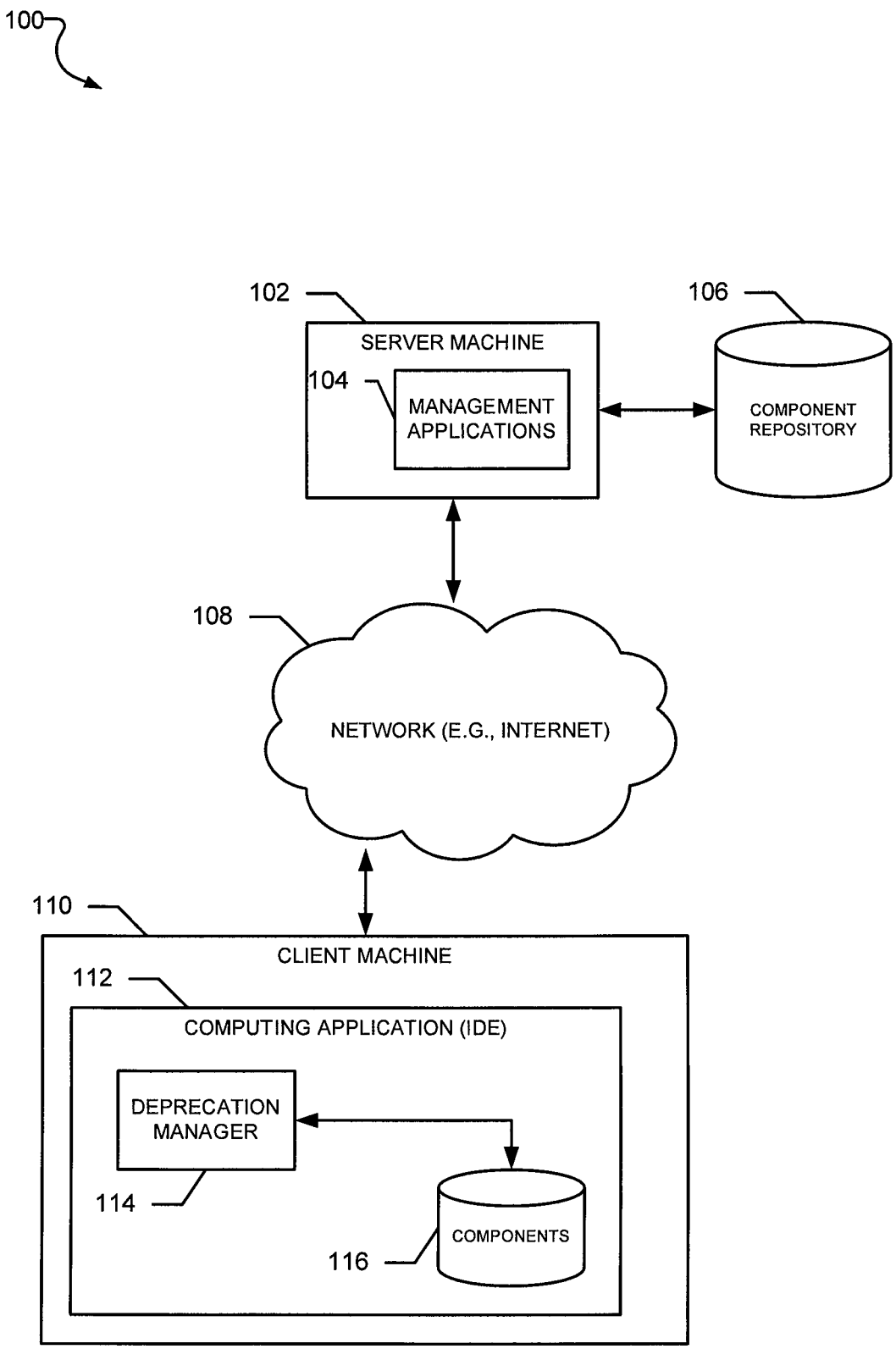
FIG. 1 is a block diagram showing a network environment within which a method and system to determine component deprecation may be implemented, in accordance with an example embodiment.

In the following detailed description, numerous specific details are set forth to provide a thorough understanding of the claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A method and system of marking the deprecation status of components, such as services, processes, operations, and data types that may be used in a computer application, and displaying this status to developers within a computing application, such as an integrated development environment (IDE), is described. Components may be marked as deprecated, or they may include information reflecting a sunset policy, which consists of either a specific date or an upcoming version number of the application or programming language the computing application supports. The sunset policy determines when a component has reached its end of life and is either no longer supported or will be removed from the underlying product.

Using this deprecation status information, the computing application is able to dynamically notify developers if and when components will be deprecated within a computing application. This functionality allows deprecation data for components to be much more discoverable than searching through documentation, which makes updating and maintaining software easier for developers. The computing application can further provide automated software migration support by recommending alternative components and assisting in their configurations, for example, in order to ease transition between new product versions. Previous methods of showing deprecation only inform developers that they should no longer use a class or component and that it may be removed in the future.

An example computing application within which component deprecation may be determined is Adobe® LiveCycle® offered by Adobe Systems Incorporated ("LiveCycle®"). It will be noted that while embodiments of the deprecation system are described with reference to LiveCycle®, a deprecation manager may be utilized advantageously to manage deprecation information within any IDE or computing application with similar functionality. As one example implementation of determining component deprecation, the deprecation manager receives deprecation data, configures the component with the deprecation data, and stores the component in a format suitable for generating a visual representation of the component utilizing the deprecation data.

FIG. 1 is a block diagram showing a network environment 100 within which a method and system to determine component deprecation may be implemented, in accordance with an example embodiment. The network environment 100 includes a client machine 110 which executes a computing application 112 (e.g., an IDE). In an example embodiment, the computing application 112 runs directly on the client machine 110. In other embodiments, the computing application 112 may run on a remote server, and the client machine 110 may act as a thin client that receives input from a user and displays the application to the user, such as in a software as a service (SaaS) or cloud computing environment. The computing application 112 contains a deprecation manager 114 that determines and displays component deprecation information to a user. This deprecation information is stored along with its associated components in a component database 116.

The client machine 110, in an example embodiment, is connected to a server machine 102 via a network 108. The network 108 may be a public network (e.g., the Internet, a wireless network, a public switched telephone network (PSTN), etc.) or a private network (e.g., a local area network, a wide area network, an intranet, etc.). The server machine 102 includes management applications 104 that interact with the computing application 112 and the deprecation manager 114. For example, the management applications 104 may keep the deprecation information stored locally on the client machine 110 up to date if there are changes made by the server machine 102 or another master system on the network 108. In an example embodiment, the server machine 102 also connects to a component repository 106 that holds a master set of components that may be accessed by the computing application 112 on the client machine 110. Although FIG. 1 illustrates the client machine 110 as part of a networked environment 100, other example embodiments include the ability for the client machine 110 to operate in a stand-alone environment without a network connection. In these cases, the computing application 112 only has access to locally stored components and deprecation information.

Figure 2:
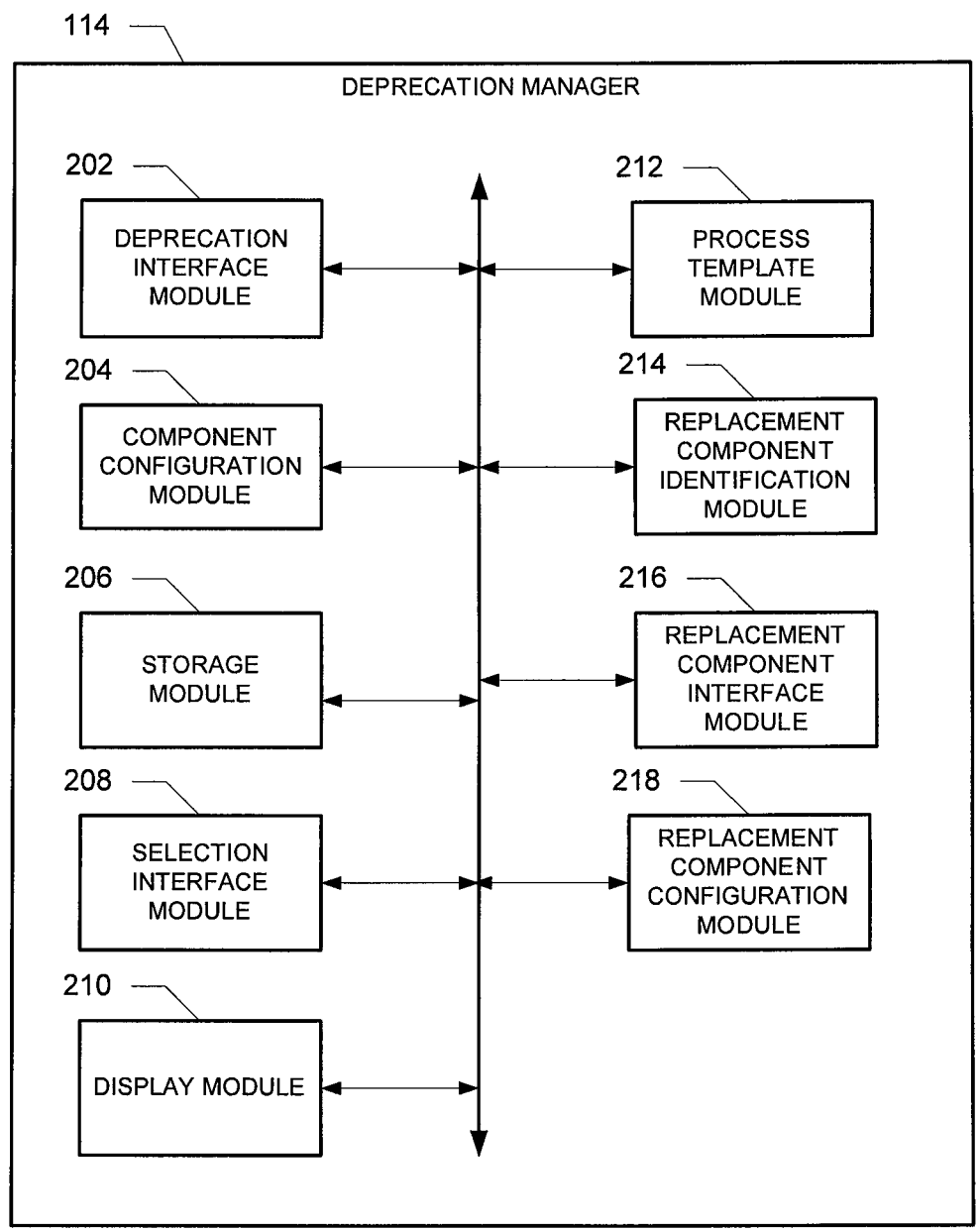
FIG. 2 is a block diagram illustrating a system to determine component deprecation, in accordance with an example embodiment.

FIG. 2 is a block diagram illustrating a system to determine component deprecation, in accordance with an example embodiment. Specifically, FIG. 2 shows the modules of the deprecation manager 114, which operates as part of the computing application 112. The deprecation manager 114 includes a deprecation interface module 202 to receive deprecation data related to a component within the computing application from a user. The deprecation manager 114 also includes a component configuration module 204 to configure the component with the deprecation data and a storage module 206 to store the component in the component database 116 (shown in FIG. 1) or to send the component to the component repository 106 (shown in FIG. 1). The storage module 206 is configured to store the component in a format suitable for generating a visual representation of the component utilizing the deprecation data. The deprecation manager 114 further includes a selection interface module 208 to receive a selection request associated with the component from the user and a display module 210 to display the visual representation of the component to the user in response to the selection request. The visual representation of the component indicates to the user whether the component is deprecated or may display other deprecation data, such as a sunset date or a replacement component.

To manage replacement components, the deprecation manager 114 includes a replacement component identification module 214 to identify a replacement component associated with the deprecation data and a replacement component interface module 216 to receive replacement configuration data associated with the replacement component from a user. The deprecation manager 114 also includes a replacement component configuration module 218 to configure the replacement component with the replacement configuration data and a process template module 212 to update a process template by replacing the component with the replacement component.

Various operations performed by the deprecation manager 114, according to an example embodiment, are discussed with reference to FIG. 3.

Figure 3:
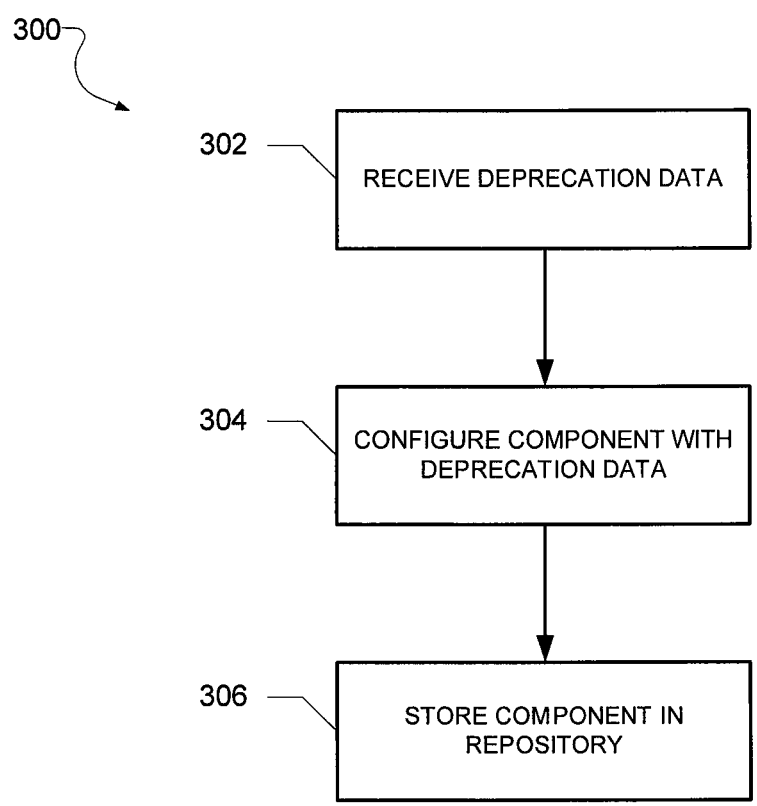
FIG. 3 is a flow chart illustrating a method to determine component deprecation, in accordance with an example embodiment.

FIG. 3 is a flow chart illustrating a method 300 to determine component deprecation, in accordance with an example embodiment. The method 300 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2, which may be implemented as software, hardware, or a combination of both.

As shown in FIG. 3, the method 300 to determine component deprecation commences with operation 302, where the deprecation manager 114 receives deprecation data. This deprecation data, in one example embodiment, is entered by a user through a user interface, either within the computing application 112 or through a separate tool. The deprecation data may also be received from the server machine 102 across the network 108, or may be loaded from a file on the client machine 110 updated through other means, such as an extensible markup language (XML) editor. At operation 304, the component configuration module 204 configures the component with the received deprecation data by modifying its attributes. In one example embodiment, these attributes are stored in a component XML file (shown in more detail in FIG. 7). At operation 306, the storage module 206 stores the configured component in the component database 116 or, in another example embodiment, transmits the component to the server machine 102 to be stored in the component repository 106. Various operations performed by modules illustrated in FIG. 2 in order to display deprecated components may be discussed with reference to FIG. 4.

Figure 4:
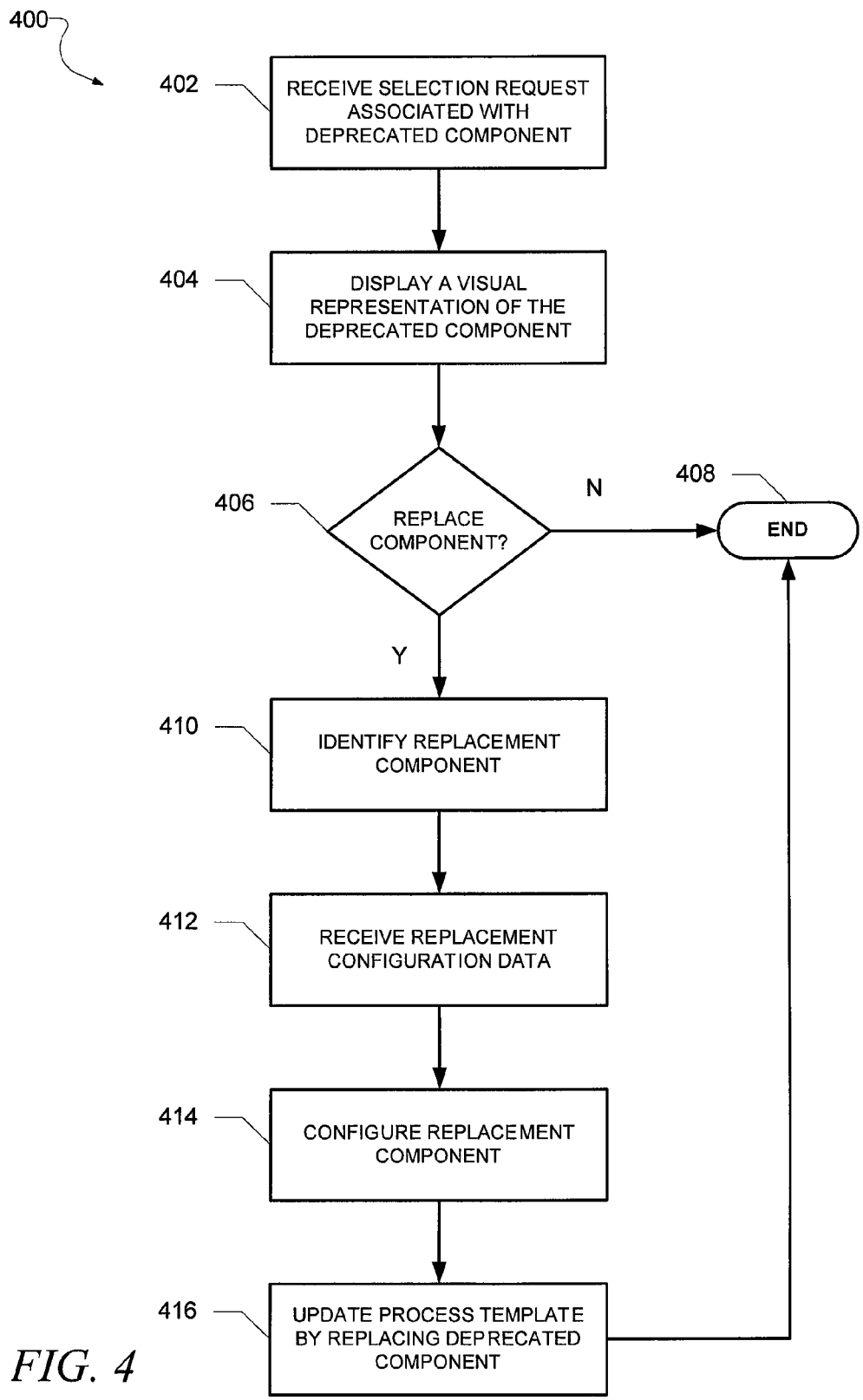
FIG. 4 is a flow chart illustrating a method to display deprecated components and replace them, in accordance with an example embodiment.
Figure 5:
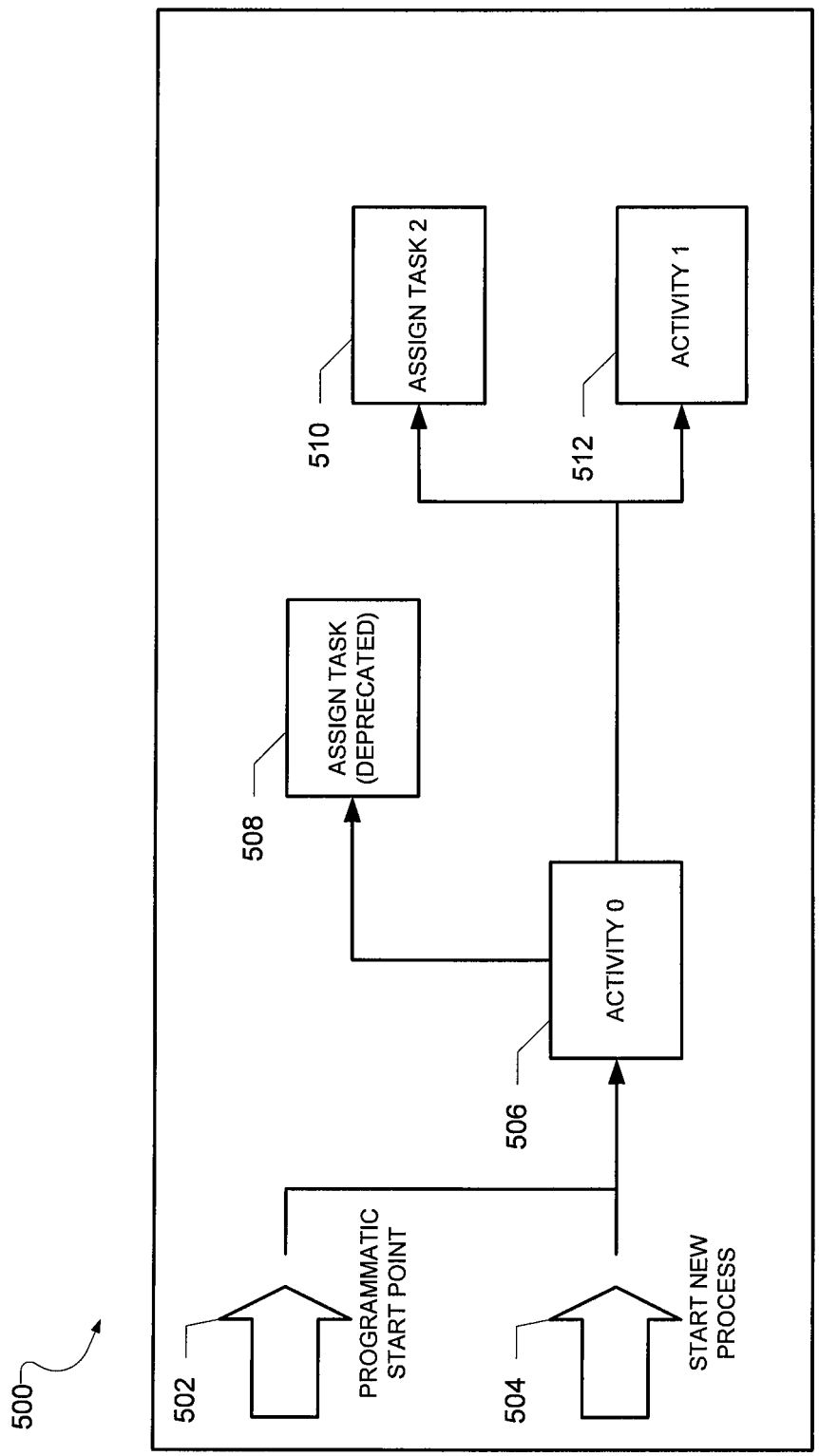
FIG. 5 is a block diagram showing a process canvas user interface used in determining component deprecation, in accordance with an example embodiment.
Figure 6:
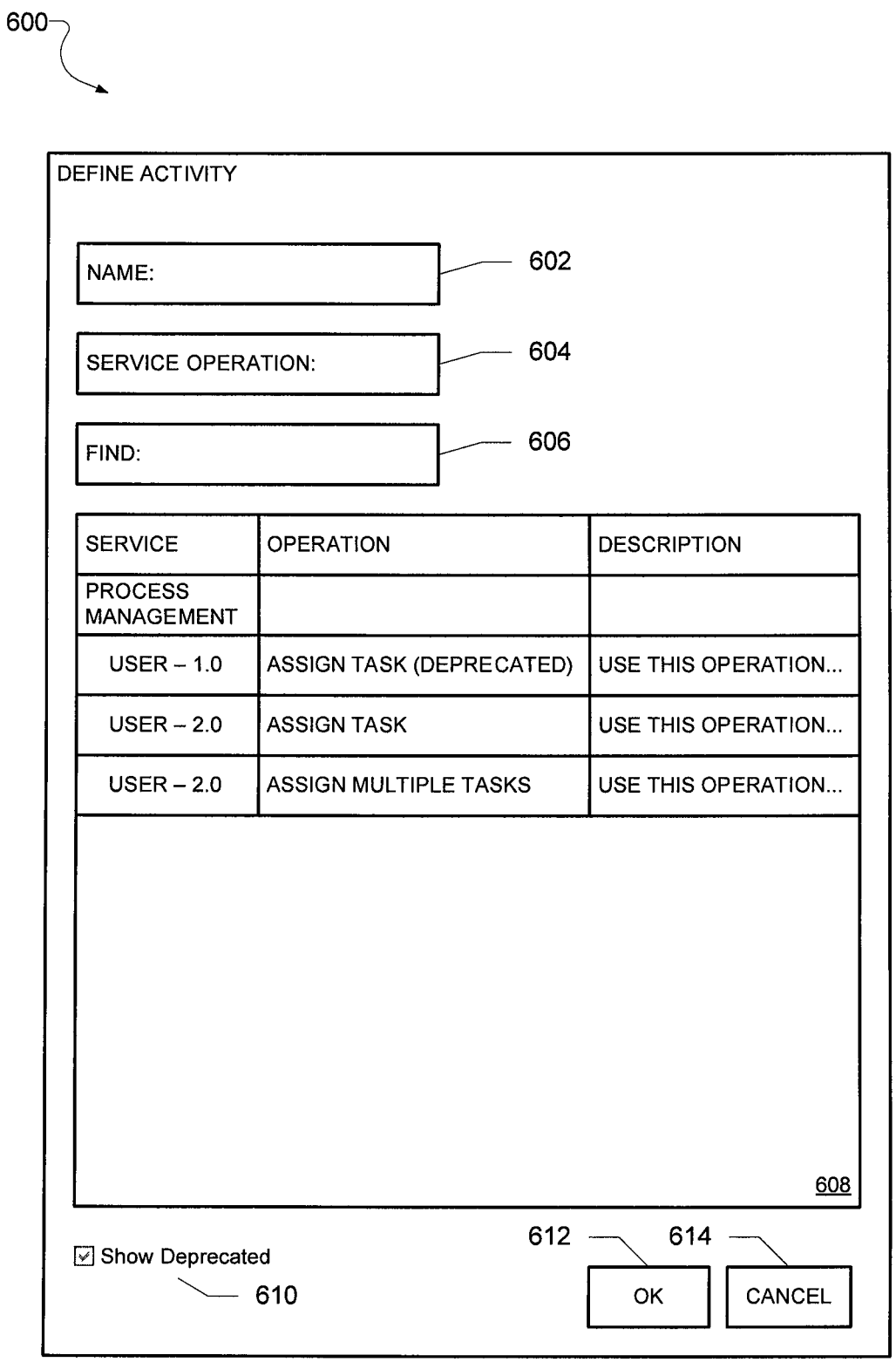
FIG. 6 is a block diagram showing a user interface that displays deprecated components, in accordance with an example embodiment.

As shown in FIG. 4, a method 400 to display deprecated components and optionally replace the deprecated components with replacement components commences at operation 402, where the selection interface module 208 of the deprecation manager 114 receives a selection request from a developer associated with a deprecated component (which may be done through the user interfaces shown in FIGS. 5 and 6). At operation 404, the display module 210 displays a visual representation of the deprecated component (shown in more detail in FIG. 5). This visual representation may contain a warning to the developer of a sunset policy, which indicates that the chosen component is deprecated and may not be available at a later date. Depending on the time until the component is removed from the computing application 112 entirely, known as the sunset date, this warning may change in severity. For example, if a chosen application programming interface (API) is expected to be removed in a certain version (e.g., version 11.1) of the computing application 112, the display module 210 may provide an explicit warning to the developer in a preceding version (e.g., version 10.0). In version 11.0, the display module 210 may switch the warning to an error informing the developer to remove the deprecated component entirely. The sunset policy may be based on an application version number, date, or other indication. Dates and version numbers for the sunset policy may be chosen by the author or maintainer of the application, then the deprecation manager 114 may create the sunset policy and associate it with the component.

If the developer chooses to replace the deprecated component at decision 406, the replacement component identification module 214 identifies a replacement component at operation 410. In an example embodiment, replacement components are listed as an attribute in the component XML. Generally, a replacement component will provide at least the same functionality as the component it is replacing, plus additional features. However, the replacement component may require additional configuration in order to utilize the additional features or to be compatible with the base functionality. For example, deprecated component A may have two string data types and an integer, but the component which replaces it, component B, may require two strings and two integers. Therefore, in order to replace component A with component B, component B needs an additional value for its extra integer data type.

The replacement component interface module 216 receives configuration data for the replacement component (if necessary from the user, or it may be automatically filled in an example embodiment) at operation 412. This replacement configuration data, in one example embodiment, is solicited from the developer by the computing application 112. The replacement component interface module 216 may display an interface that fills in known attributes and allows the developer to input values for the new attributes. In some instances, the replacement component configuration module 218 may be able to fill in default values or determine correct values for the replacement component attributes without prompting the developer. At operation 414, the replacement component configuration module 218 configures the replacement component with the replacement configuration data, and at operation 416, the process template module 212 updates a process template by replacing the deprecated component with the replacement component. The user interface is then updated to reflect the change. The method 400 terminates at end point 408.

FIG. 5 is a block diagram showing a process canvas 500 used in determining component deprecation, in accordance with an example embodiment. The process canvas 500 displays a process canvas with a number of activities and tasks. In the context of LiveCycle®, a process such as the one displayed in process canvas 500 is used to automate business processes, such as filling out paid time off forms. For example, an employee may fill out a form and submit the form to an automated process. The automated process queries an appropriate database to retrieve contact information, such as an email address, for the employee's manager, and then the process transmits the completed form to that manager. The illustrated process canvas allows a developer to design these business processes by combining activities in a process flow, and different variations on activities are possible with variables keyed on the activities. Furthermore, each of these activities can be deprecated and replaced with other activities.

The process canvas 500 example shown in FIG. 5 includes a programmatic start point 502 which marks the beginning of execution on the canvas. The start new process arrow 504 indicates the starting point of a process, which has "activity 0" block 506 as its first activity. Using the above example, activity 0 may control the form the employee fills out, such as presenting the correct form to the employee and receiving it after the employee has completed filling it out. After activity 0 is complete, the process assigns a task at block 508, which is marked as deprecated to flag to the developer that the chosen task to be assigned is deprecated. This warning informs the developer than he or she may want to choose a replacement activity. The assign task 2 block 510 and activity 1 block 512 are also programmed to be performed after activity 0 is complete. Assign task 2, for example, may involve the employee's manager reviewing the form, and activity 1 may be filing the form in a database or performing other indexing functions.

FIG. 6 is a block diagram showing a user interface 600 that displays deprecated components, in accordance with an example embodiment. The user interface 600 displays an activity picker that a developer may use to choose activity components to be placed on the process canvas shown in FIG. 5. In an example embodiment, the activity includes a name 602, such as activity 0 and activity 1, and a service operation 604. The activity picker also includes a search field 606 to narrow down a list of possible activity templates 608, which include service, operation, and description. The activity picker also provides functionality to allow the developer to choose whether to display deprecated operations. In one example embodiment, this functionality is achieved through a checkbox 610. The developer may add the defined activity using the OK button 612 or may cancel by pressing the cancel button 614.

FIG. 7 is a block of XML 700 showing components marked as deprecated and components marked as not deprecated, in accordance with an example embodiment. The component XML file shown in FIG. 7 is a descriptor file that provides the workflow engine information about the services and operations declared in a component. That is, a service with each name includes the listed operations, and the XML file provides information about each one. The component XML example shown in FIG. 7 bootstraps different classes that get called over the lifecycle of a component and defines which classes needed to be imported and exported. The component XML file also defines any extra, optional attributes for components. Component XML files, in an example embodiment, are generated automatically by code, such as an XML generation tool.

The component XML file here defines a first service named "DeprecatedService". The deprecation manager 114 that processes the component XML file may read that the deprecated status is set to true, and therefore "DeprecatedService" is deprecated in the current version of the computing application 112. The "replaced-by" attribute indicates the name of a replacement service that may be suggested to a developer as an alternative to the deprecated service. In this example, the replacement service is simply named "replacement service." The component XML also defines the sunset clause with the "sunsetting-on" attribute, which indicates a date, software version number, or other indication of when the service will no longer be included in the computing application 112. In this component XML file, "DeprecatedService" will sunset in version 10.1 of the computing application 112. Furthermore, the "deprecated-since" attribute includes an indication of when the service was first deprecated, in this case version 9.1.

The component XML file shown in FIG. 7 further defines a deprecated operation and an undeprecated service with an undeprecated operation. Additionally, in an example embodiment, these attributes cascade. If a service is deprecated, all operations under the service are automatically marked as deprecated as well.

Figure 8:
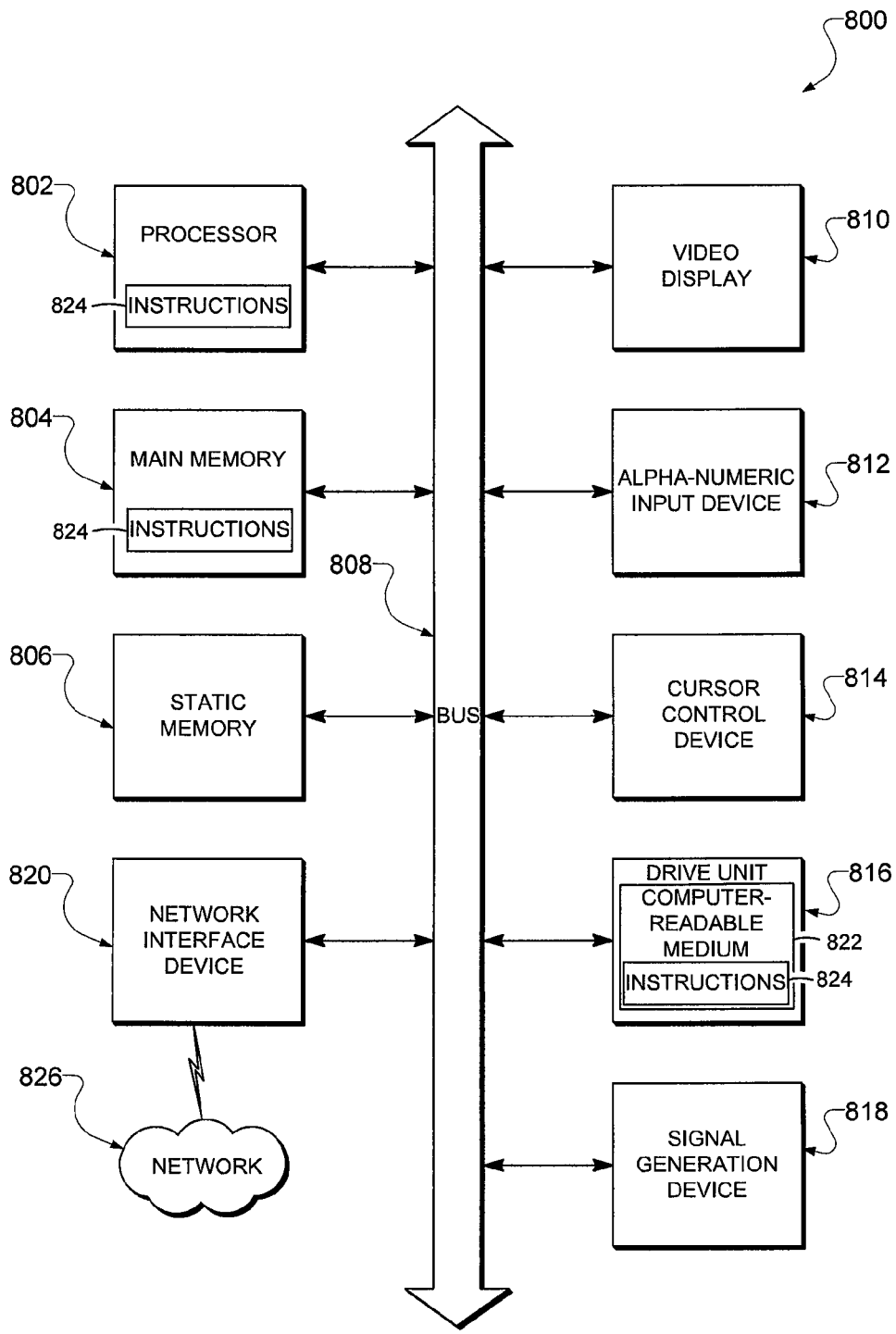
FIG. 8 is a diagrammatic representation of a machine in the example form of a computer system within which a set of instructions, for causing the machine to perform any one or more of the methodologies discussed herein, may be executed.

FIG. 8 is a diagrammatic representation of a machine in the example electronic form of a computer system 800 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a microprocessor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) cursor control device 814 (e.g., a mouse), a disk drive unit 816, a signal generation device 818 (e.g., a speaker) and a network interface device 820.

The disk drive unit 816 includes a computer-readable (or machine-readable) medium 822 on which is stored one or more sets of instructions and data structures (e.g., software 824) embodying or utilized by any one or more of the methodologies or functions described herein. The software 824 may also reside, completely or at least partially, within the main memory 804 and/or within the microprocessor 802 during execution thereof by the computer system 800, the main memory 804 and the microprocessor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the claimed subject matter, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAM), read only memory (ROM), and the like.

Thus, a method and system to determine component deprecation been described. The method and system are proposed to store a visual representation of components of a computing application. While some example approaches described herein may be used with a suite of Adobe® products, the techniques described herein may be utilized beneficially with various programs for determining the deprecation status of components within a product or a suite of products.

The embodiments described herein may be implemented in an operating environment comprising software installed on a computer, in hardware, or in a combination of software and hardware. Although embodiments have been described with reference to specific example embodiments, it is to be understood that other embodiments may be utilized and structural changes may be made without departing from the scope of the present invention. Accordingly, the specification and drawings are to be regarded in an illustrative rather than a restrictive sense.

The invention claimed is:

1. A computer-implemented method, the method comprising:
    receiving, from a server, deprecation data at a computer system, the deprecation data related to a component associated with a computing application, the computing application being an integrated development environment, the deprecation data comprising at least one of a deprecation status that the component is unsupported in the integrated development environment and a sunset policy for the component;
    configuring the component with the deprecation data;

storing the component in a format suitable for generating a visual representation of the component utilizing the deprecation data;

displaying, within the integrated development environment, a process template;

receiving a request to choose an activity component to be placed in the displayed process template;

displaying a visual representation of a plurality of activity components for selection to be placed in the displayed process template, the displaying comprising displaying a visual representation of the component configured with the deprecation data; and displaying the deprecation data of the component configured with the deprecation data in response to receiving a selection request of the component to be placed in the displayed process template in the integrated development environment.

2. The method of claim 1, wherein the component is one of a service, process, operation, or data type.

3. The method of claim 1, wherein the deprecation data includes a deprecation indicator.

4. The method of claim 1, wherein the deprecation data includes a sunset date, the sunset date indicating a date when the component is no longer available.

5. The method of claim 4, wherein the deprecation data includes a software version number associated with the sunset date.

6. The method of claim 4, wherein the deprecation data includes a replacement component to replace the component on the sunset date.

7. The method of claim 1, wherein the deprecation status includes an identification of a new version of the component called by the computing application at the computer system.

8. A computer-implemented system comprising:
a processor; and
memory; the memory comprising:
a deprecation interface module to receive, from a server, deprecation data related to a component associated with a computing application, the computing application being an integrated development environment, the deprecation data comprising at least one of a deprecation status that the component is unsupported in the integrated development environment and a sunset policy for the component;
a component configuration module to configure the component with the deprecation data and to identify a deprecated component in a visual representation in response to receiving a selection request of the component in the computing application;
a storage module to store the component in a format suitable for generating a the visual representation of the component utilizing the deprecation data;
a process canvas module for displaying a process template; and
an activity picker module:
to receive a request to choose an activity component to be placed in a displayed process template, the activity component comprising the component configured with the deprecation data,
to display a visual representation of a plurality of activity components for selection to be placed in the displayed process template, and
to display the deprecation data of the component configured with the deprecation data in response to the request to choose an activity component.

9. The system of claim 8, wherein the component is one of a service, process, operation, or data type.

10. The system of claim 8, wherein the deprecation data includes a deprecation indicator.

11. The system of claim 8, wherein the deprecation data includes a sunset date, the sunset date indicating a date when the component is no longer available.

12. The system of claim 11, wherein the deprecation data includes a software version number associated with the sunset date.

13. The system of claim 11, wherein the deprecation data includes a replacement component that replaces the component on the sunset date.

14. The system of claim 8, wherein the deprecation status includes an identification of a new version of the component called by the computing application at the computer system.

15. A machine-readable memory, disk, or combination thereof with an executable program stored thereon, wherein the program instructs a microprocessor to:
create a sunset policy associated with a deprecated component within a computing application, the sunset policy defining a date on which the deprecated component will no longer be supported by the computing application, the computing application being an integrated development environment;
display a visual representation of the deprecated component for selection to be placed in a process template, the visual representation containing a warning of the sunset policy, the warning changing in severity depending on a time until the deprecated component is removed from the computing application;
provide a notification in the computing application responsive to a request associated with the deprecated component for the deprecated component to be placed in the process template, the notification including information, from a server, identifying a replacement component and the date the deprecated component will no longer be supported;
receive replacement configuration data associated with the replacement component;
configure the replacement component with the replacement configuration data;
update the process template by replacing the component with the replacement component; and
remove the deprecated component from the computing application on the date.

16. The machine-readable memory, disk, or combination thereof of claim 15, wherein the component is one of a service, process, operation, or data type.

17. The machine-readable memory, disk, or combination thereof of claim 15, wherein the replacement component includes a new version of the deprecated component.

18. The machine-readable memory, disk, or combination thereof of claim 15, wherein the sunset policy defines a version number of the computing application in which the deprecated component will no longer be supported.

19. The machine-readable memory, disk, or combination thereof of claim 15, wherein the notification further includes a warning that increases in severity as the date becomes closer to a current date.

20. The machine-readable memory, disk, or combination thereof of claim 19, wherein the warning is an error when the date and the current date are within a predetermined threshold.

* * * * *